United States Patent
Okamoto et al.

(10) Patent No.: US 9,343,941 B2
(45) Date of Patent: May 17, 2016

(54) INVERTER TERMINAL BLOCK INSTALLED IN MOTOR CASE

(75) Inventors: Kenichi Okamoto, Makinohara (JP); Masaki Kobayashi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 457 days.

(21) Appl. No.: 13/581,907

(22) PCT Filed: Mar. 4, 2011

(86) PCT No.: PCT/JP2011/055130
§ 371 (c)(1), (2), (4) Date: Aug. 30, 2012

(87) PCT Pub. No.: WO2011/108726
PCT Pub. Date: Sep. 9, 2011

(65) Prior Publication Data
US 2012/0319513 A1    Dec. 20, 2012

(30) Foreign Application Priority Data
Mar. 5, 2010   (JP) .................................. 2010-049272

(51) Int. Cl.
*H02K 5/22*   (2006.01)
*H01R 13/52*  (2006.01)
(Continued)

(52) U.S. Cl.
CPC ............. *H02K 5/225* (2013.01); *H01R 13/5202* (2013.01); *H01R 4/183* (2013.01); *H01R 4/34* (2013.01); *H01R 13/74* (2013.01); *H01R 2201/26* (2013.01); *H02K 5/24* (2013.01)

(58) Field of Classification Search
CPC ........ H01R 13/05; H01R 13/111; H01R 4/34; H01R 4/183; H01R 13/74; H01R 13/5202; H01R 2201/26; H02K 5/225
USPC .................................................. 439/247, 278
See application file for complete search history.

(56) References Cited

U.S. PATENT DOCUMENTS 4,720,157 A * 1/1988 Nestor et al. .................. 439/851
5,517,401 A   5/1996 Kinoshita et al.
(Continued)

FOREIGN PATENT DOCUMENTS

CN    101038995 A   9/2007
JP    4-136881 U   12/1992
(Continued)

OTHER PUBLICATIONS

Chikada et al., machine translation of jp2005310585, Nov. 2005.*
(Continued)

*Primary Examiner* — Quyen Leung
*Assistant Examiner* — Eric Johnson
(74) *Attorney, Agent, or Firm* — Sughrue Mion, PLLC

(57) ABSTRACT

In a terminal block 10 which is interposed between a motor case 100 and an inverter case 200 placed in the motor case 100 and connects a motor input terminal to an inverter output terminal, an upper base 10U for accommodating an inverter side connecting terminal 20T connected to the inverter output terminal is fixed to the inverter case 200, and a lower base 10D for accommodating a motor side connecting terminal 20M is fixed to the motor case 100, and a waterproof and elastic member 60 is interposed between the upper base 10U and the lower base 10D and the motor side connecting terminal 20M is connected to the inverter side connecting terminal 20T by a flexible conductive member (a braided wire) 20H.

6 Claims, 4 Drawing Sheets

(51) Int. Cl.
    *H01R 4/18*     (2006.01)
    *H01R 4/34*     (2006.01)
    *H01R 13/74*     (2006.01)
    *H02K 5/24*     (2006.01)

(56) References Cited

U.S. PATENT DOCUMENTS

| | | | |
|---|---|---|---|
| 5,752,852 | A | 5/1998 | Onoda |
| 5,801,465 | A * | 9/1998 | Yamada ........................ 310/71 |
| 5,916,002 | A * | 6/1999 | Gottschalk et al. ........... 439/839 |
| 6,953,357 | B2 | 10/2005 | Fukushima et al. |
| 7,588,449 | B2 | 9/2009 | Takehara |
| 7,749,010 | B2 | 7/2010 | Takehara |
| 2004/0195016 | A1 | 10/2004 | Shimizu et al. |
| 2004/0214464 | A1 | 10/2004 | Fukushima et al. |
| 2004/0253124 | A1 * | 12/2004 | Ioi et al. .................... 417/410.1 |
| 2007/0059967 | A1 | 3/2007 | Itou |
| 2007/0138882 | A1 | 6/2007 | Tsukashima et al. |
| 2007/0218747 | A1 | 9/2007 | Takehara |
| 2007/0296290 | A1 * | 12/2007 | Tsukashima ........... H02K 5/225 310/71 |
| 2009/0108688 | A1 | 4/2009 | Miura |
| 2009/0291586 | A1 | 11/2009 | Takehara |
| 2010/0176683 | A1 * | 7/2010 | Waddell ................. H02K 3/527 310/180 |

FOREIGN PATENT DOCUMENTS

| | | | |
|---|---|---|---|
| JP | 5-219607 | A | 8/1993 |
| JP | 06-26184 | U | 4/1994 |
| JP | 7-201406 | A | 8/1995 |
| JP | 9-134756 | A | 5/1997 |
| JP | 9-147963 | A | 6/1997 |
| JP | 11-265755 | A | 9/1999 |
| JP | 2000-150071 | A | 5/2000 |
| JP | 2001-155817 | A | 6/2001 |
| JP | 2001-212512 | A | 8/2001 |
| JP | 2003-115357 | A | 4/2003 |
| JP | 2003-157722 | A | 5/2003 |
| JP | 2004-215348 | A | 7/2004 |
| JP | 2004-312853 | A | 11/2004 |
| JP | 2004-327169 | A | 11/2004 |
| JP | 2005-229753 | A | 8/2005 |
| JP | 2005-229755 | A | 8/2005 |
| JP | 2005-310585 | A | 11/2005 |
| JP | 2005310585 | A * | 11/2005 |
| JP | 2005-333748 | A | 12/2005 |
| JP | 2006080215 | A * | 3/2006 |
| JP | 2006-261100 | A | 9/2006 |
| JP | 2007-80737 | A | 3/2007 |
| JP | 2007-280913 | A | 10/2007 |
| JP | 2007-311123 | A | 11/2007 |
| JP | 2008-243566 | A | 10/2008 |
| JP | 2008-301544 | A | 12/2008 |
| JP | 2009-70656 | A | 4/2009 |
| JP | 2009-142038 | A | 6/2009 |
| JP | 2009-195080 | A | 8/2009 |
| JP | 2011-165428 | A | 8/2011 |

OTHER PUBLICATIONS

Hayami et al., machine translation of jp2006080215, Mar. 2006.*
Information Offer Form dated Jan. 7, 2014 in counterpart Japanese Patent Application No. 2010-049272.
Office Action dated Feb. 18, 2014 issued by the Japanese Patent Office in counterpart Japanese Patent Application No. 2010-049272.
Office Action dated Apr. 1, 2014 issued by the State Intellectual Property Office of P.R. China in counterpart Chinese Application No. 201180012575.X.
Office Action dated Aug. 28, 2014 issued by the State Intellectual Property Office of P.R. China in counterpart Chinese Patent Application No. 201180012575.X.
Communication dated May 22, 2014, issued by the Japanese Patent Office in counterpart Japanese Application No. 2010-049272.
International Search Report for PCT/JP2011/055130 dated Apr. 5, 2011 [PCT/ISA/210].
Written Opinion for PCT/JP2011/055130 dated Apr. 5, 2011 [PCT/ISA/237].
Communication from the Japanese Patent Office dated Oct. 7, 2014, in a counterpart Japanese application No. 2010-049272.
Office Action dated Nov. 25, 2014, issued by the State Intellectual Property Office of the P.R. of China in counterpart Chinese Application No. 201180012575.X.
Communication dated Dec. 8, 2015 issued by the Japanese Patent Office in counterpart Japanese Patent Application No. 2015-001879.
Notification of Reasons for Refusal issued on Nov. 25, 2015 by the Japanese Patent Office in related Application No. 2015-001878.
Opposition to Patent issued on Nov. 18, 2015 by the Japanese Patent Office in related Application No. 2015-700201.
Communication dated Dec. 22, 2015 issued by Japanese Intellectual Property Office in counterpart Japanese Patent Application No. 2015-001877.

* cited by examiner

INVERTER TERMINAL BLOCK INSTALLED IN MOTOR CASE

TECHNICAL FIELD

The present invention relates to a suitable inverter terminal block unaffected by vibration under an environment of occurrence of the vibration in the case of installing an inverter used for a vehicle etc. in a motor case.

BACKGROUND ART

An electric vehicle or a hybrid electric vehicle generally includes a motor and an inverter between a battery and wheels in order to drive the wheels by electric power accumulated in the battery.

The electric power accumulated in the battery is converted by the inverter of an inverter device etc. and is supplied to the motor and rotates the motor, and rotation of the motor is transmitted to the wheels and drives the wheels.

Conventionally, the inverter and the motor were mounted in separate places of the vehicle and a terminal of the inverter was connected to a terminal of the motor using a wire harness.

On the other hand, a structure of integrating an inverter with a motor for the purpose of cost reduction and miniaturization of an electric driving system from a battery to wheels has been proposed recently (Patent Reference 1 or 2).

<Invention Described in Patent Reference 1 or 2>

FIG. 4 is a conceptual diagram of an invention of integrating an inverter with a motor described in Patent Reference 1 or 2, and a power receiving box 100C is placed on a motor case 100 for accommodating a three-phase AC motor (an induction motor or a synchronous machine), and motor input terminals 100T for receiving three-phase AC electric power are attached to the power receiving box 100C and on the other hand, inverter output terminals 200T are attached to an inverter case 200 of the inverter for receiving a DC from a DC power source placed on the other part of a vehicle and converting the DC into an three-phase AC. Then, connecting conductors L are used for supplying the three-phase AC electric power of the inverter from the inverter output terminals 200T to the motor input terminals 100T of the power receiving box 100C.

<Merit of Invention Described in Patent Reference 1 or 2>

A structure shown in FIG. 4 is assembled by separately assembling the motor case 100 and the inverter case 200 and then installing the inverter case 200 in the vicinity of the motor case 100 and also electrically connecting the motor input terminals 100T to the inverter output terminals 200T by the connecting conductors L. Thus, the inverter case 200 and the motor case 100 have the structure which is assembled and manufactured as separate modules and is electrically connected by the connecting conductors L at the time of integration, so that manufacture is easy and cost can be reduced.

<Demerit of Invention Described in Patent Reference 1 or 2>

However, in such a configuration, a vibration phase difference between the inverter and the motor by vibration of the motor itself or vibration of a vehicle body at the time of driving is applied to a connector and the connector may be damaged. Therefore, it is necessary to develop a connector capable of withstanding such vibration.

Then, a connector described in Patent Reference 3 is disclosed as the connector capable of withstanding such vibration.

PRIOR ART REFERENCE

Patent Reference

Patent Reference 1: JP-A-5-219607
Patent Reference 2: JP-A-2004-312853
Patent Reference 3: JP-A-2007-280913

<Configuration of Terminal Block Described in Patent Reference 3>

A terminal block described in Patent Reference 3 is means for connecting a motor input terminal to an inverter output terminal, and is characterized in that an inverter cabinet and an inverter side terminal and a motor cabinet and a motor side terminal are included and while the motor side terminal is fixed and attached to the motor cabinet, the inverter side terminal is attached to the inverter cabinet through a vibration absorber.

<Merit of Terminal Block Described in Patent Reference 3>

Since the terminal of one device is attached to the cabinet of its device through the vibration absorber thus, even when vibration by a phase difference is applied to one device and the other device, its vibration is absorbed by the vibration absorber, so that an extra load is not applied to a connector connection and adverse influences of damage etc. can be prevented.

DISCLOSURE OF THE INVENTION

Problems that the Invention is to Solve

<Problem of Terminal Block Described in Patent Reference 3>

In the terminal block described in Patent Reference 3, metal materials of a bus bar etc. are used variously in order to ensure continuity performance. However, since rigidity of a bus bar member or a terminal is high, this terminal block has a problem that when the terminal block is assembled to a vibration generation region, the bus bar member or the terminal is broken or bent to be deformed by a subsequent long period of use and sealing performance decreases.

Object of the Invention

The invention has been implemented in order to solve the problem described above, and an object of the invention is to provide a terminal block resistant to vibration occurring between a motor side connecting terminal and an inverter side connecting terminal, the terminal block with good waterproof and oilproof properties, capable of sufficiently exerting a sealing effect on vibration even in the case of great variations due to assembly tolerances of a motor and an inverter.

Means for Solving the Problems

In order to solve the problem described above, a first invention of the present application is a terminal block which is interposed between a motor case and an inverter case placed in the motor case and electrically connects a motor input terminal to an inverter output terminal, and is characterized in that an upper base for accommodating an inverter side connecting terminal connected to the inverter output terminal is fixed to the inverter case, and a lower base for accommodating a motor side connecting terminal connected to the motor input terminal is fixed to the motor case, and a waterproof and elastic member is interposed between the upper base and the lower base and the motor side connecting terminal is electrically connected to the inverter side connecting terminal by a flexible conductive member.

In the terminal block of the first invention, a second invention of the present application is characterized in that a waterproof rubber stopper is interposed between the upper base and the inverter case.

In the terminal block of the first or second invention, a third invention of the present application is characterized in that a waterproof rubber stopper is interposed between the lower base and the motor case.

Advantage of the Invention

While a conventional terminal block constructs the inverter side connecting terminal and the motor side connecting terminal by the integral terminal block, according to the first invention as described above, the upper base for accommodating the inverter side connecting terminal is separated from the lower base for accommodating the motor side connecting terminal in the terminal block and the elastic member is interposed between the upper base and the lower base, so that vibration of the motor side becomes resistant to propagating to the inverter side and moreover, the terminal block resistant to vibration can be obtained by connecting the motor side connecting terminal to the inverter side connecting terminal by the flexible conductive member.

Further, since the elastic member interposed between the upper base and the lower base is provided with waterproof properties, even if a vehicle is submerged in water and the water enters a gap between the motor case and the inverter case, the water can be prevented from entering the inside of the terminal block from a fitted part of the upper base and the lower base by the waterproof and elastic member.

According to the second and third inventions of the present application, the waterproof rubber stoppers are interposed between the upper base and the inverter case and between the lower base and the motor case, respectively, so that waterproof properties of the terminal block are ensured more.

MODE FOR CARRYING OUT THE INVENTION

A terminal block of the invention with good waterproof and oilproof properties, capable of sufficiently exerting a sealing effect on vibration even when strong vibration occurs between a motor side connecting terminal and an inverter side connecting terminal and variations due to assembly tolerances of a motor and an inverter are great will hereinafter be described based on the drawings.

<Terminal Block According to the Invention>

Figure 1:
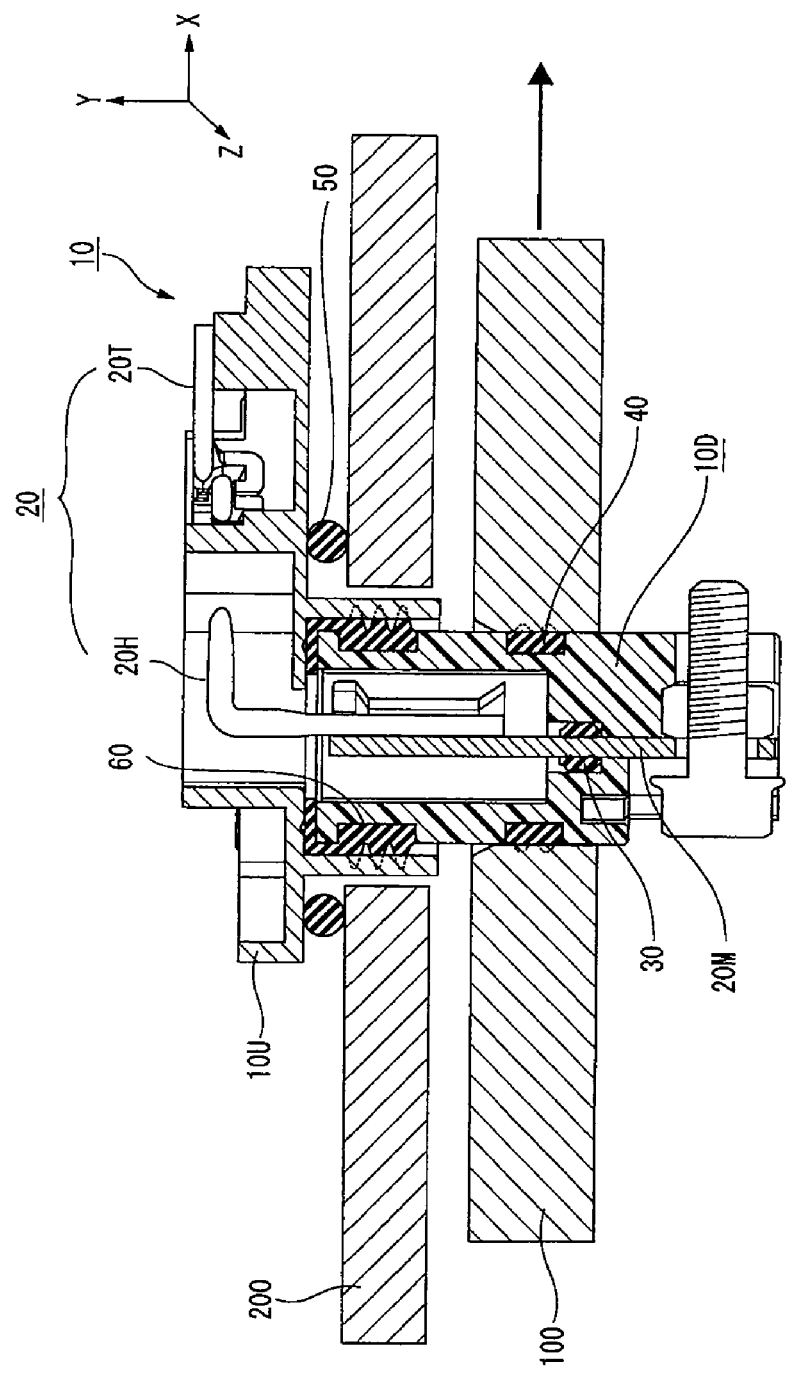
FIG. 1 is a longitudinal sectional view of a terminal block according to the invention.
Figure 2:
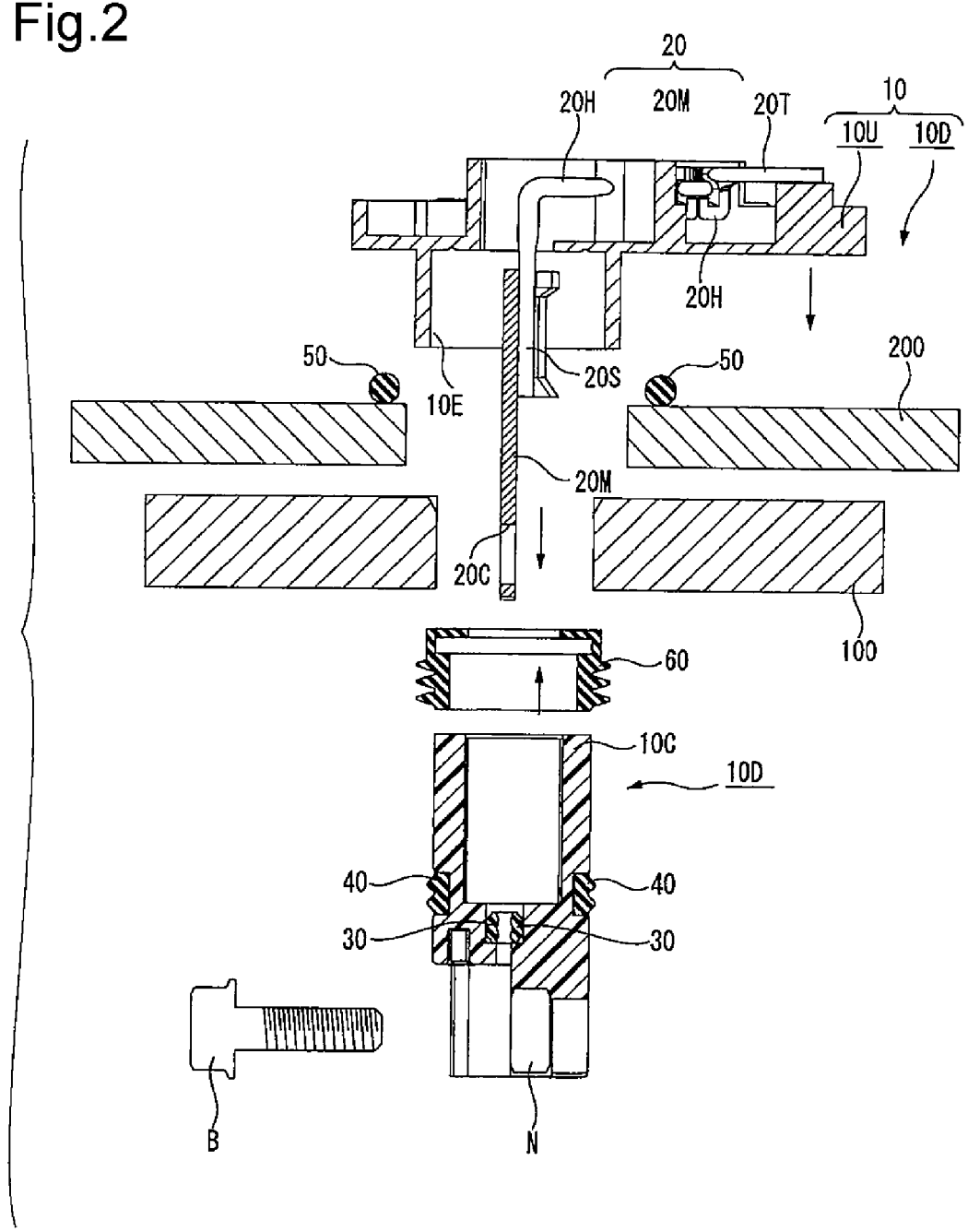
FIG. 2 is a longitudinal sectional view exploding and showing the terminal block of FIG. 1.

In FIG. 1 showing a longitudinal section of a terminal block according to the invention and FIG. 2 exploding and showing the terminal block of FIG. 1, numeral 100 is a motor case and numeral 200 is an inverter case placed in the motor case 100.

Numeral 10 is a terminal block according to the invention interposed between the motor case 100 and the inverter case 200. The terminal block 10 is a container molded of resin, and is means for receiving three-system electric conductors 20 (an inverter side connecting terminal 20T, a braided wire 20H and a motor side connecting terminal 20M) for supplying an AC three-phase current produced in the inverter side to the motor side. According to the invention, in the terminal block 10, an upper base 10U and a lower base 10D are separately configured and the inverter side connecting terminal 20T is accommodated in the upper base 10U and the motor side connecting terminal 20M is accommodated in the lower base 10D and the inverter side connecting terminal 20T is connected to the motor side connecting terminal 20M by the braided wire 20H.

<Electric Conductor 20>

The electric conductor 20 includes the inverter side connecting terminal 20T, the motor side connecting terminal 20M, and the braided wire 20H whose one side is connected to the inverter side connecting terminal 20T and the other side is connected to the motor side connecting terminal 20M by a crimping part 20S (FIG. 2). One end of the braided wire 20H is connected to the inverter side connecting terminal 20T in a horizontal state inside the upper base 10U, and the other end of the braided wire 20H extends after downward bent vertically from the horizontal state in order to turn to the side of the lower base 10D, and is connected to the motor side connecting terminal 20M by the crimping part 20S in the distal end.

Figure 3:
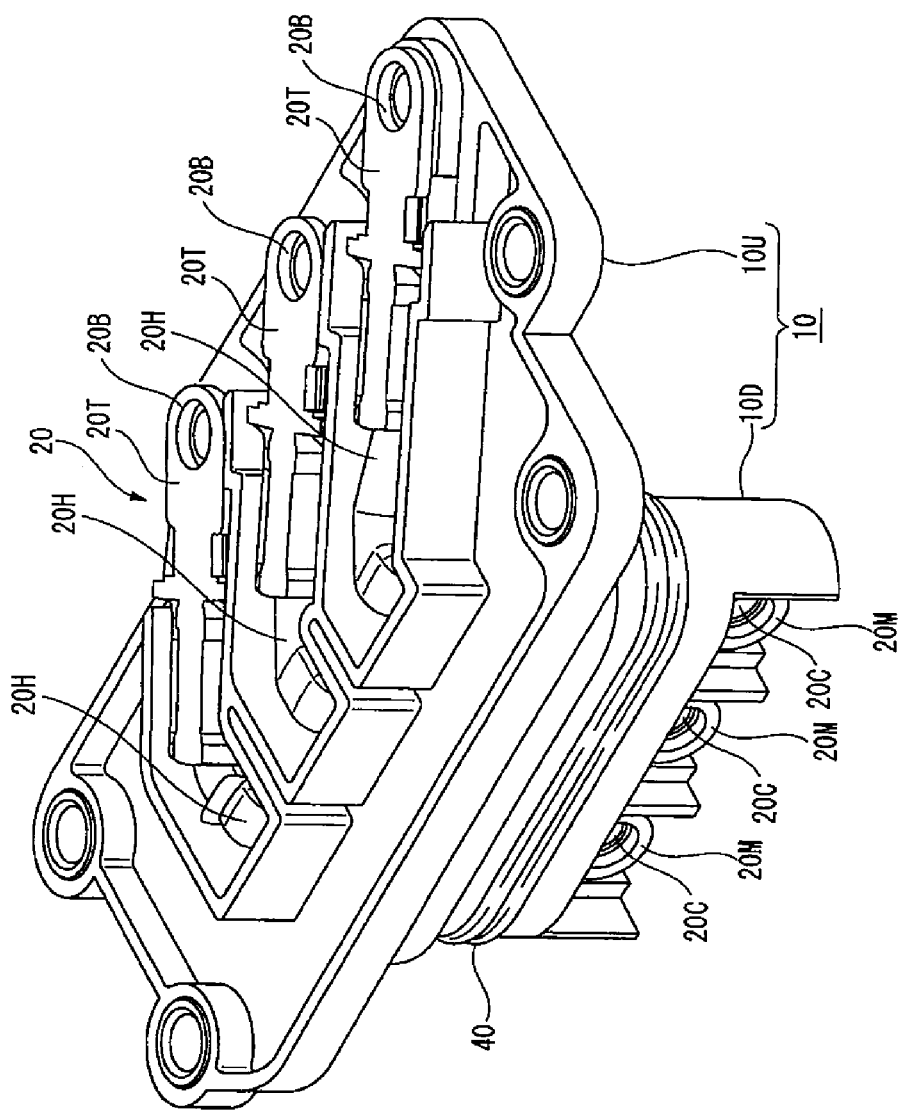
FIG. 3 is a perspective view of the terminal block according to the invention.

Bolt through holes 20B (FIG. 3) and 20C (FIG. 2) are respectively bored in each of the inverter side connecting terminals 20T and each of the motor side connecting terminals 20M, and an inverter output terminal 200T (FIG. 4) of the inverter case 200 (FIG. 4) is inserted into the bolt through hole 20B and is tightened by a nut.

Figure 4:
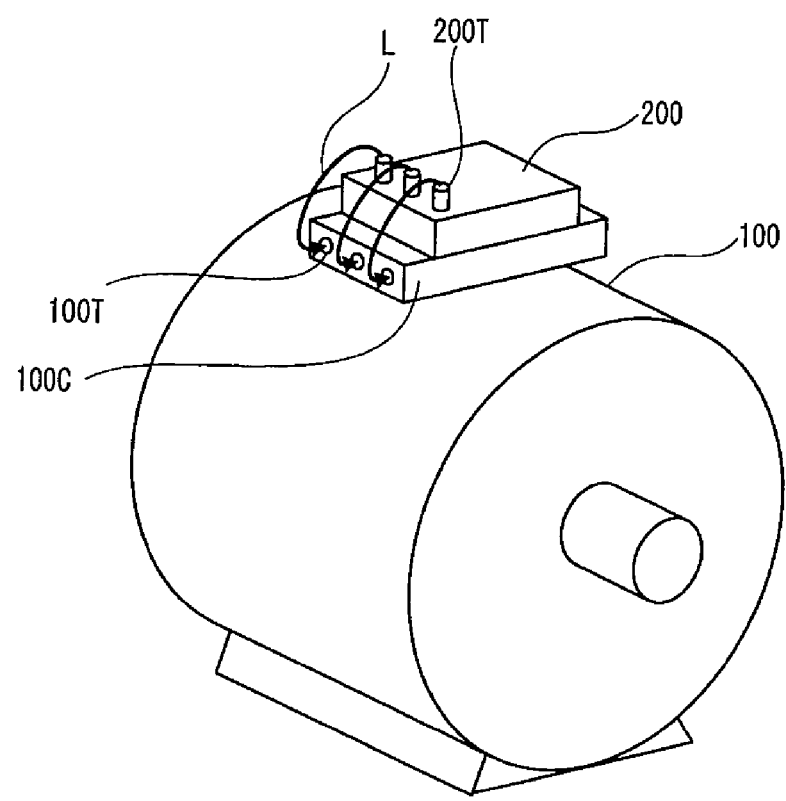
FIG. 4 is a conceptual diagram of an invention of integrating an inverter with a motor described in Patent Reference 1 or 2.

Also, a bolt is inserted into the bolt through hole 20C and is tightened on, for example, a motor input terminal 100T (FIG. 4) of a power receiving box 100C (FIG. 4) on the side of the motor case 100 (FIG. 4).

Packing 30 for, for example, preventing an oil leak from a motor is attached to the motor side connecting terminal 20M.

In addition, the braided wire 20H is used herein, but flexibility can be given by providing a bus bar with a bent part, so that such a bus bar with the bent part can be used or conductive rubber can be used.

<Upper Base 10U and Lower Base 10D>

In the side of the upper base 10U, the three inverter side connecting terminals 20T are horizontally juxtaposed through resinous partition walls, respectively, and each of the braided wires 20H is connected to each of the ends of the inverter side connecting terminals 20T. The other end of the braided wire 20H is set in a vertical state in order to turn to the downward lower base 10D from the horizontal state. The three braided wires 20H in the vertical state pass through a long cylindrical part 10E formed in the lower portion of the upper base 10U.

The whole lower base 10D is formed in a long cylindrical part, and in this long cylindrical part, the three braided wires 20H and the motor side connecting terminals 20M respectively crimped and connected to these braided wires 20H are vertically juxtaposed through resinous partition walls, respectively. The top 10C (FIG. 2) of the lower base 10D is fitted into the long cylindrical part 10E formed in the lower portion of the upper base 10U through a waterproof and elastic member 60 (described below).

<Configuration of Waterproof and Elastic Member 60>

Also, the waterproof and elastic member 60 is interposed between the upper base 10U and the lower base 10D according to the invention. The waterproof and elastic member 60 has a long cylindrical shape with a ceiling, and an opening into which the motor side connecting terminals 20M and the crimping part 20S can be inserted is formed in the ceiling part, and a corrugated shape having chevron and trough parts in cross section view is formed on the long cylindrical lateral part. The top 10C of the lower base 10D is inserted into an internal opening of the long cylindrical part and this part is inserted into the long cylindrical part 10E of the lower portion of the upper base 10U and thereby, the corrugated-shaped chevron parts of the waterproof and elastic member 60 are crushed, and vibration absorption and waterproofness are ensured between the upper base 10U and the lower base 10D.

In addition, in display of the waterproof and elastic member 60 of FIG. 1, the original shape of the normal waterproof and elastic member 60 is shown by intentionally showing lip parts of the waterproof and elastic member 60 in a state in which an external force is not applied by an inner peripheral surface of the upper base 10U by dotted lines, and biting into the inner peripheral surface of the upper base 10U is not shown.

<Material of Waterproof and Elastic Member 60>

As material of the waterproof and elastic member 60, a rubber member with good oilproof properties can be used and, for example, acrylic rubber is given concretely.

<Effect of Waterproof and Elastic Member 60>

Even when the lower base 10D moves in an arrow direction (FIG. 1) of the drawing due to vibration of the motor side, such a waterproof and elastic member 60 is used in this lower base 10D and thereby, an elastic member of the waterproof and elastic member 60 absorbs the vibration, and the vibration becomes resistant to propagating to the inverter side of the separate upper base 10U.

Moreover, connection between the upper base 10U and the lower base 10D is made by the flexible braided wire 20H rather than a conventional bus bar, so that the vibration becomes more resistant to propagating to the inverter side.

Also, since the upper base 10U is separated from the lower base 10D and a waterproof function is provided to the waterproof and elastic member 60 arranged in the fitted place, even if a vehicle is submerged in water and the water enters a gap between the motor case 100 and the inverter case 200, the water can be prevented from entering the inside of the terminal block 10 from the fitted part of the upper base 10U and the lower base 10D by the waterproof and elastic member 60.

Other Embodiment

Further, a waterproof rubber stopper 40 is interposed between the lower base 10D and the motor case 100, and a waterproof rubber stopper 50 is also interposed between the upper base 10U and the inverter case 200. This can more prevent water from entering the inside of the terminal block 10.

<Merit of the Invention>

While the inverter side connecting terminal and the motor side connecting terminal are constructed by an integral terminal block conventionally, according to the invention, the upper base for accommodating the inverter side connecting terminal is separated from the lower base for accommodating the motor side connecting terminal and an elastic member is interposed between the upper base and the lower base, so that vibration of the motor side becomes resistant to propagating to the inverter side.

Moreover, the terminal block resistant to vibration can be obtained by connecting the motor side connecting terminal to the inverter side connecting terminal by the braided wire. Further, since the elastic member interposed between the upper base and the lower base is provided with waterproof properties, even if a vehicle is submerged in water and the water enters a gap between the motor case and the inverter case, the water can be prevented from entering the inside of the terminal block from the fitted part of the upper base and the lower base by the waterproof and elastic member.

The present application is based on Japanese patent application No. 2010-049272 filed on Mar. 5, 2010, and the contents of the patent application are hereby incorporated by reference.

DESCRIPTION OF REFERENCE NUMERALS AND SIGNS

TERMINAL BLOCK
10U UPPER BASE
10E LONG CYLINDRICAL PART
10D LOWER BASE
10C TOP OF LOWER BASE
20 ELECTRIC CONDUCTOR
20M MOTOR SIDE CONNECTING TERMINAL
20H BRAIDED WIRE
20S CRIMPING PART
20T INVERTER SIDE CONNECTING TERMINAL
20B,20C BOLT THROUGH HOLE
30 PACKING
40 WATERPROOF RUBBER STOPPER
50 WATERPROOF RUBBER STOPPER
60 WATERPROOF AND ELASTIC MEMBER
100 MOTOR CASE
100C POWER RECEIVING BOX
100T MOTOR INPUT TERMINAL
200 INVERTER CASE
200T INVERTER OUTPUT TERMINAL

The invention claimed is:

1. A terminal block which is interposed between a motor case and an inverter case placed in the motor case and electrically connects a motor input terminal to an inverter output terminal, the terminal block comprising:
    an upper base for accommodating an inverter side connecting terminal connected to the inverter output terminal, the upper base being fixed to the inverter case;
    a lower base for accommodating a motor side connecting terminal connected to the motor input terminal, the lower base being fixed to the motor case;
    a waterproof and elastic member interposed between the upper base and the lower base such that the upper base does not contact the lower base; and
    a flexible conductive member configured to electrically connect the motor side connecting terminal to the inverter side connecting terminal,
    wherein the waterproof and elastic member comprises an opening into which a connecting part between the motor side connecting terminal and the flexible conductive member is inserted, and
    wherein a portion of the flexible conductive member is disposed in the opening formed in the waterproof and elastic member.

2. The terminal block as claimed in claim 1, wherein a waterproof rubber stopper is interposed between the upper base and the inverter case.

3. The terminal block as claimed in claim 1, characterized in that a waterproof rubber stopper is interposed between the lower base and the motor case.

4. The terminal block according to claim 1, wherein the flexible conductive member comprises a braided wire.

5. The terminal block according to claim 1, wherein the flexible conductive member provides resistance to vibration occurring between the motor side connecting terminal and the inverter side connecting terminal.

6. The terminal block according to claim 1, wherein the flexible conductive member provides resistance to vibration occurring between the upper base and the lower base.

* * * * *